UNITED STATES PATENT OFFICE.

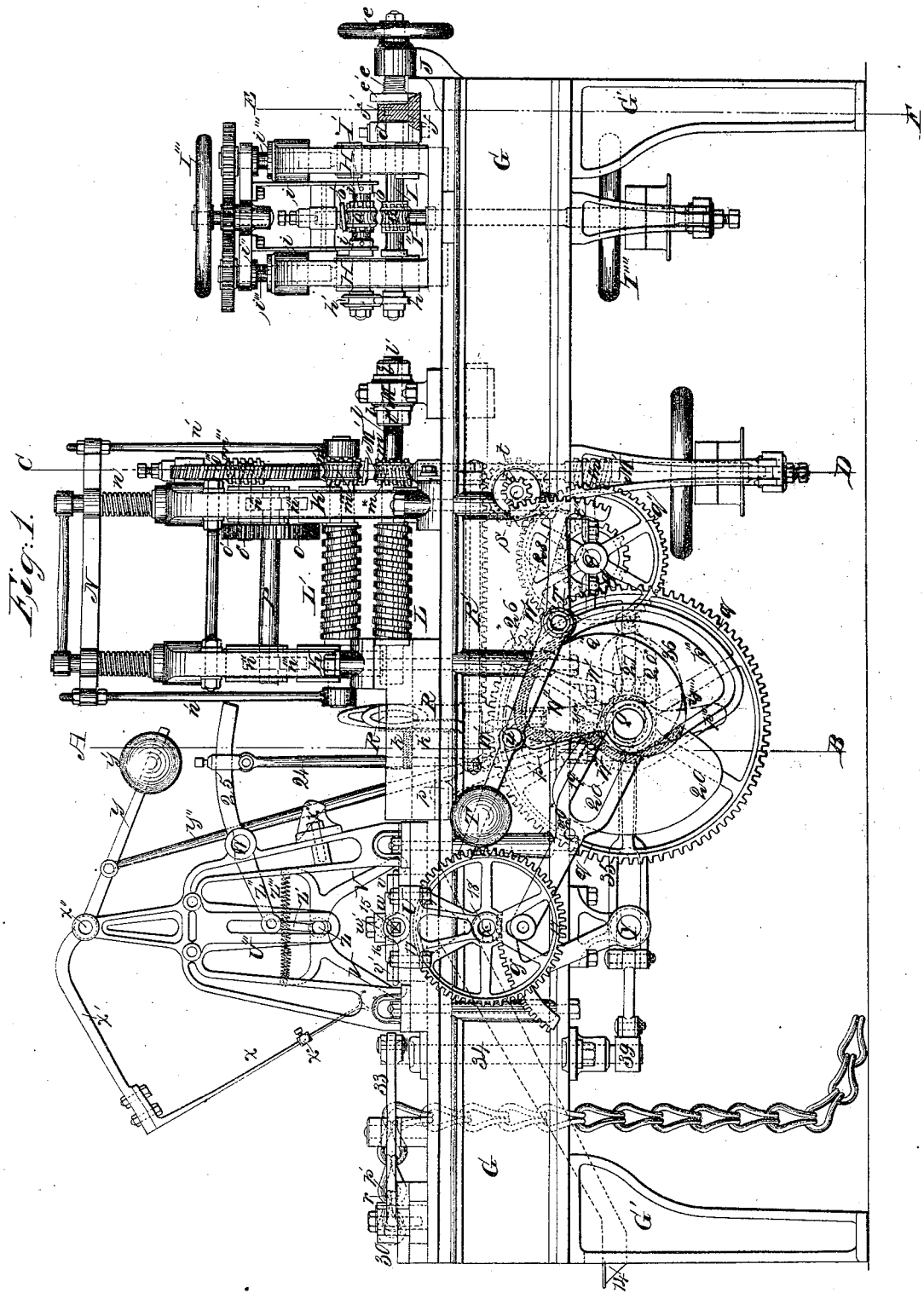

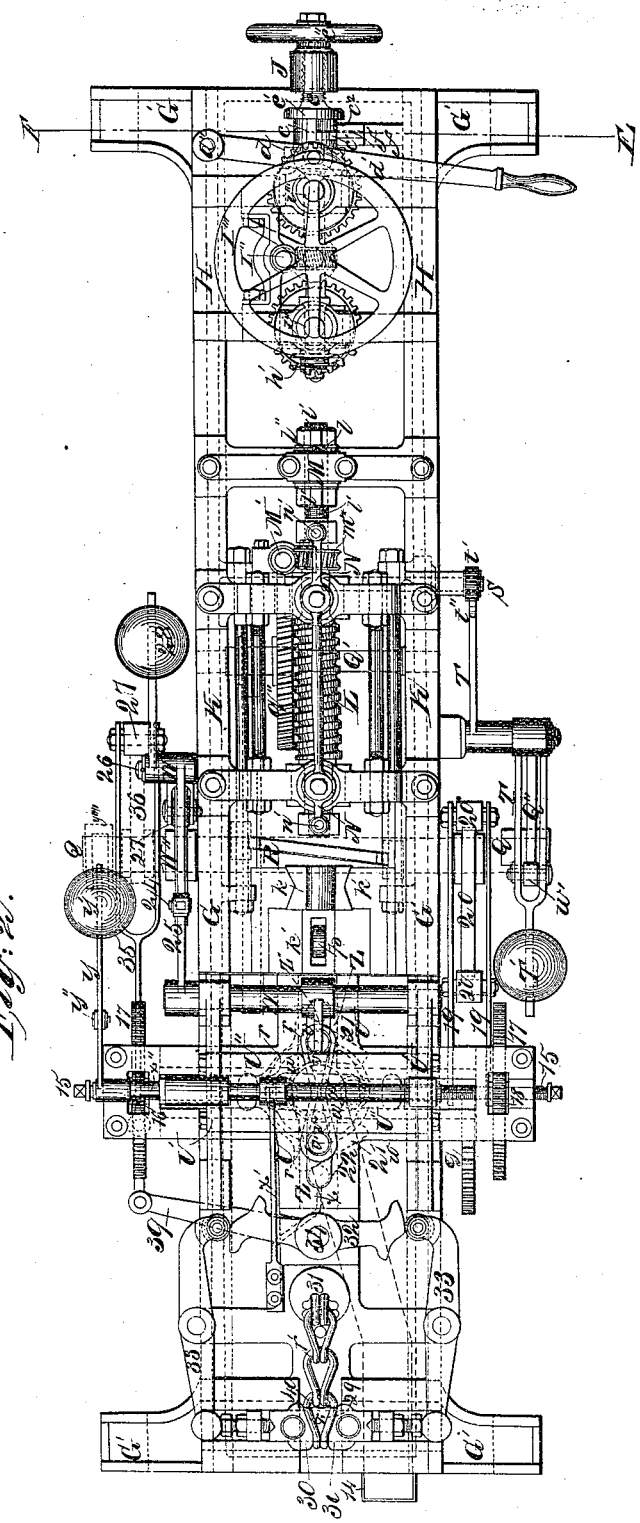

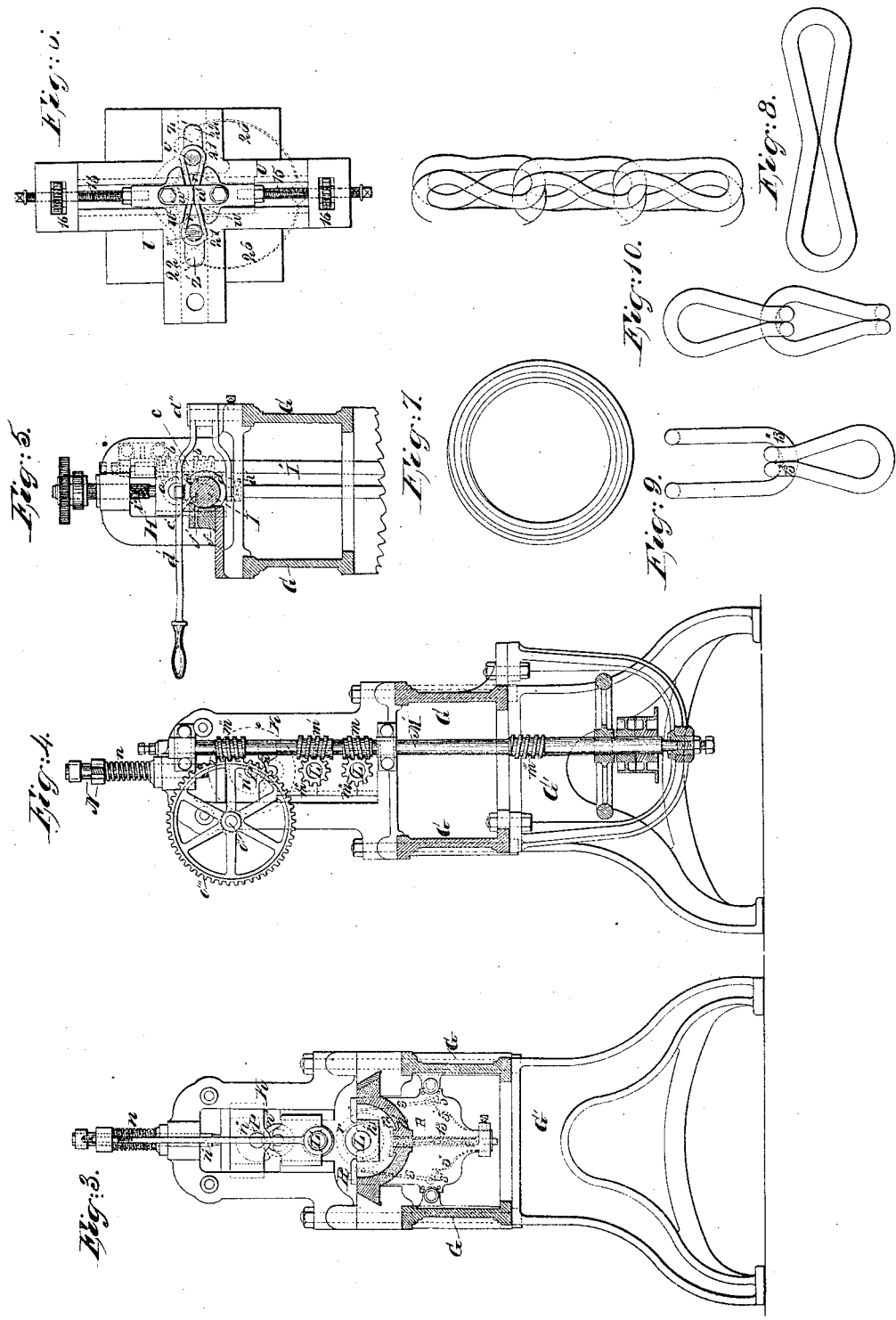

EDUARD WEISSENBORN, OF NEW YORK, N. Y.

IMPROVEMENT IN CHAIN-MAKING MACHINES.

Specification forming part of Letters Patent No. 13,929, dated December 11, 1855.

*To all whom it may concern:*

Be it known that I, EDUARD WEISSENBORN, of the city, county, and State of New York, have invented a new and useful Machine for the Manufacture of Chain; and I do hereby declare that the following is a full, clear, and exact description of the same, reference being had to the accompanying drawings, forming part of this specification, in which—

Figure 1 is a side elevation of the machine. Fig. 2 is a plan of the same. Fig. 3 is a vertical transverse section in the line A B of Fig. 1. Fig. 4 is a vertical transverse section in the line C D of Fig. 1. Fig. 5 is a vertical transverse section in the line E F of Figs. 1 and 2. Fig. 6 is a plan of a portion of the machine, which is partly concealed in Fig. 2. Fig. 7 illustrates the manner of forging the rings from which the links of the chain are produced. Fig. 8 exhibits the form which the ring first receives in being converted into a link. Fig. 9 is a side view showing two links bent together, but not closed. Fig. 10 is a side view at right angles to Fig. 9, showing the links closed to form a portion of the chain. Fig. 11 is a perspective view of a short piece of the chain complete.

Similar letters of reference indicate corresponding parts in the several figures.

The chain which this machine is intended to manufacture is not of the kind in most common use, but is what may be termed "double-link" chain, as it is composed not of pairs of links, but strictly of double links, which are each formed entirely of one piece of metal. This description of chain as produced by this machine is very far superior in strength to the single-link chain in common use.

The working parts of the machine are all carried by a strong bed of cast-iron G G. At that end of this bed which is shown to the right of the spectator in Figs. 1 and 2 there is certain mechanism by which the rings of which the links are to be made are formed ready for welding; but as this mechanism constitutes no part of the present invention, and is intended to be subject of other Letters Patent, it will not be described in this specification. I will, however, state how I intend to form these rings, in order to give an idea of the great strength of the chain produced by the machine. To form the links I take thin flat iron rod and coil it up, as shown in Fig. 7, to form a ring of the necessary thickness, after which I weld it up solid. Those parts of the machine included in the present invention perform the whole of the manufacture of the chain from the welding of the links formed as above described.

The first part of the machine to be described is that by which the welding of the rings is performed, which is shown near the middle of Figs. 1 and 2 and partly in Figs. 3 and 4. In these figures, K K is a fixed head-stock containing the bearings for two rollers L L', which have each a round-bottomed spiral groove in its periphery, both grooves having the same pitch, but that in the lower roller running spirally in one direction and that in the upper roller in the opposite direction. The grooves in the rollers are a little the largest at the right-hand end, and at the left-hand end, when the rollers are close together, the section of the two grooves is a circle of the same size as the finished welded iron ring is desired to have. The rollers rotate at the same speed, but in opposite directions. The ring formed as before described is heated to a welding heat, and in that state is slipped over the left-hand end of the lower roller L, the left-hand bearing $k$ of the said roller being moved away and the upper roller L' being raised up for that purpose, and is moved up to the right-hand end of the roller and hung in its groove, after which the bearing $k$ of the said roller is replaced and the upper roller L' brought down close to it, the ring being then grasped firmly between the two rollers, by whose rotary motion it is caused to revolve between them and travel along toward the left-hand ends, and by that means, being gradually more and more compressed by the constantly-diminishing size of the grooves, is very perfectly welded and finished with a smooth surface. The bearing $k$ moves away again at the approach of the ring to allow the ring to be drawn over the end of the roller L, and after the ring leaves the grooves of the rollers the upper roller L' is raised to allow another ring to be slipped over.

In order to adjust the two rollers L L' so that the parts of their respective grooves which are contiguous to each other will be exactly opposite each other to form a perfect circular die, a third bearing M is provided in addition to the bearings in the head-stock K K. This bearing is fixed; but the shaft of the roller is provided with a variable journal $l$, which is adjustable by a screw $l'$ and nuts $l''$ on the said shaft. The longitudinal position of the roller is regulated by the position of the journal $l$, which has large shoulders, while the other two journals of the roller are made without shoulders, so as to be capable of moving longitudinally in their bearings when necessary.

The rotary motion of the rollers L L' is derived from right and left handed endless screws $m\ m'$ on an upright shaft M', gearing with worm-wheels $m^*\ m'^*$ on the roller-shafts. The raising of upper roller L', to allow the ring to be slipped over the lower roller up to the right-hand end, is performed by two springs $n\ n$ acting upon a yoke N, which is connected by two rods $n'\ n'$ with the ends of the shaft of the roller. The roller is depressed to its operative position to weld the ring and held down firmly in that position during the whole time it is required to continue in operation by means of two cams $n''\ n''$ on a shaft P, supported in fixed bearings in the head-stock K, which cams act upon two rollers $n'''\ n'''$, whose journals rest in the top of the bearings of the upper roller. The shaft P receives rotary motion at a slow speed, properly proportioned to the operation of the rollers L L', through a spur-wheel $o$ and through a pinion $o'$ on a small shaft $o''$, which receives motion through a worm-wheel $o'''$ from an endless screw $m'$ on the upright shaft M. The withdrawal and replacement of the movable bearing $k$ of the roller L are effected by means of a lever $p$ of the first order working on a fixed fulcrum $p'$ between the sides of the bed. This lever, which is within the bed of the machine, is shown in dotted outline in Fig. 1. Its upper end enters into a slot in a sliding carriage $k'$, which carries the bearing, and its lower end carries a pin $p''$, which enters a groove in a cam $p'''$ on a shaft Q, which receives rotary motion through a spur-wheel $q$ fast upon it from a smaller spur-wheel $q'$ on a shaft Q', which receives motion through a worm-wheel $q''$ from an endless screw $m'''$ on the upright shaft M'. The ring $r$, Figs. 1 and 3, is put upon the roller L by a sliding box R, (see Figs. 1, 2, and 3,) into which it is placed, and which is just wide enough to receive the ring in an upright position. This box is so shaped as to hold the ring $r$ at an oblique angle to the axis of the rollers and parallel with the direction assumed by the highest part of the groove of the roller L, and it has suitable openings in the front and back sides for the roller L to pass through.

The heated ring, when taken from the fire, is placed in the box R by an attendant, the box being at that time in the position shown in Figs. 1 and 2, and when first received in the box it is supported by a false bottom, which rests on a spiral spring 13, and it is kept in place by two fingers $s\ s$, (shown in dotted outline in Fig. 3,) which are fitted to pivots $s'\ s'$ within the box and are drawn toward each other by springs $s''\ s''$, and in this way the ring is held at the height indicated by dotted lines in Fig. 1, which enables it to pass along the whole length of the roller L without obstruction; but when the box has arrived at the right-hand end of the rollers the descent of the roller L drives the ring down into the box, causing it to force down the false bottom 12 and force apart the fingers $s\ s$. The ring remains in the box during the whole of the welding operation. The box receives its forward movement to place the ring between the rollers through a toothed rack R', attached to it, from a pinion $t$ on a shaft S, which receives the necessary motion at the proper time to drive forward the ring quickly through a pinion $t'$ from a toothed sector $t''$ at one end of a lever T of the first order, having a fixed fulcrum $u$, the action of the sector on the pinion being produced by the fall of the opposite end of the lever under the influence of a weight T' attached thereto. This lever is set free at the proper time for the weight to act upon it by a cam Q'' on the shaft Q, on a concentric portion of the periphery of which cam the lever has been previously supported in a stationary condition long enough to keep the box R stationary while the ring is put in. This cam Q'', acting on a roller $u'$, attached to the lever, raises the weighted end of the lever to make the sector reverse the motion of the pinion $t'$, shaft S, pinion $t$, and rack R' to carry back the box as the welding proceeds. This movement must be properly timed and at a proper speed relatively to the movement of the rollers L L' and pitch of their grooves.

The next operation to be performed after the welding of the ring and before it is allowed to cool is to elongate it in one direction and draw the two long sides together, which brings it to the shape represented in Fig. 8, after which it is bent to the form shown in Fig. 9, in which figure the lower link is supposed to be seen looking in the same direction as Fig. 7, but the upper link is in a position at right angles thereto. The part of the machine by which these operations are performed is shown in Figs. 1 and 2 at the left hand of the welding machinery and also partly in Fig. 6. The ring is elongated by the moving apart of two upright posts $v\ v'$, over which it is placed when it is taken from the box R, and the elongated sides are forced together by the movement of two sliding dies $w\ w$, which are shown in Fig. 6 and also shown in Fig. 2 in dotted outlines tinted blue, and which work at right angles to the posts $v\ v'$. The posts $v\ v'$ are carried by two slides Z Z', working in guides in a double plate U, secured to the bed G, and the sliding dies $w\ w$ work in guides in the said plate. The posts $v\ v'$ and their slides Z Z' are best shown in Fig. 6, as in that figure all the parts of the machine which stand above them are omitted.

Before entering minutely into the operation of the above studs and sliding dies it will be better to describe the manner in which the ring is taken from the box R and placed over the posts $v\,v'$. This is effected by a carrier $x$, consisting of an elastic steel bar forked at its extremity and attached to an arm $x'$ on a rock-shaft $x''$, which works in bearings at the top of two standards U′ U′, erected upon a plate U. The rock-shaft $x''$ has another arm $y$, which carries a weight $y'$, and has suspended from it a rod $y''$, at the lower end of which is a roller $y'''$, which rests upon a cam $y''''$ on the shaft Q. This cam, as well as the rod $y''$, are shown in blue outline in Fig. 1 to prevent confusion with the other parts of the machine. The rod should be furnished with a yoke at its lower end to fit the shaft and confine the roller $y'''$ to the cam; but this is not shown in the drawings. Just as the ring-box R draws the welded ring off the shaft the cam $y''''$ raises the rod $y''$ and the arm $y$ of the rock-shaft $x'''$, depressing the arm $x'$ and thereby throwing forward the carrier $x$. As the fork of the carrier arrives near the ring a stud $x^*$, which is secured to one side of the elastic bar, comes in contact with the inclined under surface of a fixed guide-piece $x''''$ on one of the standards U′ and is sprung downward, and thereby directed to the upper part of the ring, which it receives in its fork. The instant after the fork receives the ring the stud $x^*$ passes the end of the guide-piece $x''''$ and springs upward, lifting the ring up out of its box. By this time the most prominent part of the cam $y''''$ passes the roller $y'''$, and the weight $y'$ falls and raises the arm $x'$, drawing back the carrier $x$ with the ring. As the carrier goes back its fork passes nearly close to the tops of the posts $v\,v'$, which are at that time in their nearest positions relatively to each other, and drags the ring in nearly a horizontal position over the plate U until the ring catches against the first post $v$, and is thereby arrested and caused to be released by the carrier as the latter continues its retreat, and when released it drops on the plate U with both the posts inside it, as shown in dotted black outline in Fig. 2. At the time the ring is received around the posts $v\,v'$ the dies $w\,w$ are at their greatest distance apart, so that the ring is received between them. The dies $w\,w$ approach each other simultaneously with the moving apart of the posts $v\,v'$, and thus give the ring the link form shown in Fig. 8, which is also shown in Figs. 2 and 6, in the former of which figures the posts $v\,v'$ are shown in strong black outline and the dies $w\,w$ in dotted outline tinted blue in the condition of just having operated upon the ring to produce the link form, and in the latter figure both the posts $v\,v'$ and dies $w\,w$ are shown in black outline. The reason for representing the dies in dotted outline in Fig. 2 is that they are concealed by a table U″, extending across between the standards U′ U′ for the support of guides U‴ U‴ for a pair of hooks V V, by which the bending of the link to the form shown in Fig. 9 is effected. In Fig. 6 this table and the guides and hooks are omitted. The bend of the link is made round two dies $w'\,w'$, attached to or forming part of the dies $w\,w$, the said dies $w'\,w'$ standing above the faces of the dies $w\,w$ and coming close together, as shown in Fig. 6, when the dies $w\,w$ have approached each other near enough to bring the link to the form shown in Fig. 8. These dies $w'\,w'$ may be cylindrical, of a size to correspond with the interior of the bend 13* 13*, (see Fig. 9,) which is to be given to the link, or they may be of any other form that will admit of such a bend being given, the lower parts of them of course corresponding to the desired bend. The hooks V, by which the bending of the link is effected, resemble what are sometimes known as "grappling-hooks," being in the form of levers pivoted together by a pin $z$. This pin is suspended by a link $z'$ from the arm $z''$ of a rock-shaft W, and it works in the vertical fixed guides U‴ U‴. The upper ends of the two hooks are connected together by a light spring $z'''$, which just serves to keep the hooks open, or, in other words, to keep their points as far apart as is necessary to receive the link. The hooks descend in an open state, as shown in Fig. 1, before the separating movement of the posts $v\,v'$ to elongate the link commences, and the points of the hooks, which are properly formed to receive the ends of the link within them, enter into a recess in the plate, so as to be below the link. The elongation of the link brings its ends over the points of the hooks, which begin to rise as soon as the elongation of the link is finished. The dies $w\,w$ do not begin to retreat for some time after they have finished their operation on the link, and thus the dies $w'\,w'$ remain closed long enough for the bending to be effected by the ascent of the hooks V V. It will be understood that as the hooks are pivoted together they will yield readily to the change of form of the link as it bends, the resistance of the link to the bending operation being sufficient to draw the points of the hooks toward each other. After the bending of the link has been effected in this way, the hooks receive a slight downward movement, and this taking place before the dies $w'\,w'$ have separated far enough for the link to descend liberates the hooks from the link and they immediately open, leaving the link free to fall through the opening in the plate U between the dies $w\,w$, when the latter have separated, and into a conductor, by which it is to be conveyed to a box 14 at the extreme left-hand end of the machine, where is placed the mechanism for closing the links together to form the chain.

The manner of effecting the movements of the posts $v\,v'$, the dies $w\,w$ and $w'\,w'$, and the hooks V V will now be explained, and then the explanation of the mechanism for closing will be proceeded with. The dies $w$ $w$ and $w'$ $w'$ are moved toward each other and drawn back again at proper intervals by means of two screws 15 15, one right and the other left handed, which are connected to them in such a way as not to be capable of turning, but are moved back and forth by two rotary nuts 16 16, whose exteriors are toothed to form spur-wheels, gearing with two larger spur-wheels 17 17 on a shaft X, which passes right through the bed and derives an intermittent rotary motion through a pinion 18, behind the front spur-wheel 17, from a toothed sector $g$, which oscillates on a rock-shaft Y, the said sector receiving motion by its connection with the cam-yoke 19 of a cam 20 on the shaft Q, the said yoke being slotted to fit the shaft Q for the purpose of guiding its movement and the cam working between two rollers 20* 20* within the yoke. The posts $v$ $v'$ are driven apart to elongate the ring and form the link by means of a double-inclined piece or wedge 21 21, secured to the under side of one of the dies $w$ $w$ and acting upon two studs 22 22, secured to the under side of the slides Z Z', which carry the posts $v$ $v'$. The slides Z Z' are brought toward each other again that the posts $v$ $v'$ may be in readiness to receive the next ring by two springs 23 23. (Shown in red outline in Fig. 6.) The rock-shaft W receives the necessary movement to operate the hooks V V through a rod 24, connecting its arm 25 with one arm of a three-armed or T-shaped lever W', which works on a fixed fulcrum 26 at the back of the bed. Of the other two arms of this lever one carries a roller 27, which bears against and receives the necessary motion to work the rock-shaft from a cam W'', on the shaft Q and the other carries a weight 28, by which the roller is kept in contact with the cam.

The part of the machine by which the closing of the links is effected consists of a stationary block 29 and two dies 30 30, moving horizontally toward and from it. The block is secured to the bed of the machine and is horizontally of the form of the open part which the link is to have when the ends are closed, and the contiguous faces of the dies 30 30 are of the same form as the sides of the link are to have externally when closed. The link as it leaves the hooks V V is taken with a pair of tongs from the box 14 by an attendant stationed in readiness, and if it is the first ring of a chain it is put directly over the block 29, (represented by $r'$ in Figs. 1 and 2;) but if it is not the first ring it is put just half-way through the last closed ring before being put on the block. It is put on the block at a time when the dies are drawn away from the block, and the dies directly after approach the block and close the link. The block 29 is made with a recess 40 (see Fig. 2) to receive part of the previously-closed link $r'$. Every link, after being closed, is secured by its successor passing through it. The finished chain passes down through a hole 31 and falls on the floor or into a suitable receptacle. The dies 30 30 are driven toward the block to close the link by means of a horizontal cam 32 acting on two levers 33 33, the said cam receiving motion through an arm 39 at the bottom of its vertical shaft 34 from a yoke-rod 35, which is operated upon by a cam 36 on the shaft Q. This cam is shown in Figs. 1 and 2 in red outline to distinguish it from the other cams on the same shaft. This rod is made with a slot to work on the rock-shaft V as a guide. The roller 37 of the cam-yoke 35 is kept in contact with the cam by a spring applied to the arm 39 of the shaft 34, which spring serves to draw back the cam to allow the levers 33 33 to come back and the dies 30 30 to open to admit of the removal of the link from the block 29. The dies 30 30 are opened or drawn back by springs within the bed of the machine, which are not visible in the drawings.

This machine is not limited in its application to the manufacture of chain from rings formed by welding a coil of thin iron rod, as described in the early portion of this specification, as the rings may be formed in any other way; but the above-named method of forming the rings will give the chain a greater strength than when the rings are formed in any other way.

What I claim as my invention, and desire to secure by Letters Patent, is—

1. The employment, for welding the rings, of two rollers grooved spirally in opposite directions and operating substantially as herein described.

2. Arranging one of the end bearings $k$ of one of the spirally-grooved welding-rollers so as to be capable of sliding lengthwise to the roller, substantially as described, far enough to allow the ring to be slipped over the end of the roller.

3. The within-described manner of raising, depressing, and confining the upper roller to allow the ring to be slipped over the lower roller—to wit, by means of the rods $n'$ $n'$, the yoke N, the springs $n$ $n$, and the cam-shaft P, with its cams $n''$ $n''$, the whole being arranged and operating substantially as herein set forth.

4. The traveling box R, operating, substantially as described, to carry the rings quickly over the end of and up to the back end of the welding-roller L and to come back with the ring at a speed properly corresponding with the velocity of the rollers and pitch of their spiral grooves.

5. The carrier $x$, operating, substantially as described, first, to move forward to receive the ring in its fork, then moving quickly upward to snatch the ring from the box, and afterward dragging the ring along the plate which contains the elongating mechanism till it comes in contact with one of the elongating-posts or its equivalent, and is thereby taken from the fork of the carrier.

6. The combination of the movable posts $v\ v'$ and side dies $w\ w$, operating, substantially as described, to elongate the ring, and at the same time close or drive toward each other the elongating sides.

7. The arrangement of the dies $w'\ w'$, round which the link is bent or doubled, substantially as described relatively to the dies $w\ w$, by which the elongated sides of the link are forced toward each other, and their attachment to the same, whereby when the link has received the form shown in Fig. 8 it is caused to be in readiness to be bent or doubled by the action of the hooks V V or their equivalent.

8. Operating the posts $v\ v'$, by which the elongation of the ring is performed, by means of a wedge or double-inclined piece 21, attached to one of the side dies $w'$, acting upon studs 22, attached to the slides which carry the said posts, whereby the approach of the side dies toward each other and retreat of the posts from each other are effected simultaneously.

9. The suspension of the bending-hooks at their pivot $z$ and application of a spring to draw their points apart, substantially as herein described, so that the said hooks will descend in an open state and will be in condition to receive the link when the latter is sufficiently elongated, but that in ascending and drawing up the ends of the link they will gradually close as required by the changing form of the link.

EDUARD WEISSENBORN.

Witnesses:
　　JAS. GEO. MASON,
　　WILLIAM TUSCH.